United States Patent [19]
Quast

[11] 3,892,666
[45] July 1, 1975

[54] THICKENER WITH ELEVATABLE SCRAPER AND NON-ELEVATING SKIMMER

[75] Inventor: Gilbert W. Quast, Brookfield, Wis.

[73] Assignee: Envirex Inc., Milwaukee, Wis.

[22] Filed: Mar. 18, 1974

[21] Appl. No.: 452,209

[52] U.S. Cl. .............................................. 210/520
[51] Int. Cl.² ........................................ B01D 21/18
[58] Field of Search .......... 210/519, 520, 523, 525, 210/528, 531

[56] References Cited
UNITED STATES PATENTS

| | | | |
|---|---|---|---|
| 2,360,817 | 10/1944 | Scott | 210/531 |
| 2,650,707 | 9/1953 | Scott | 210/531 |
| 2,861,693 | 11/1958 | Wooh | 210/531 |
| 3,140,259 | 7/1964 | Kelly | 210/528 |
| 3,245,544 | 4/1966 | Petersen | 210/531 |
| 3,741,399 | 6/1973 | Peterson | 210/525 |
| 3,770,132 | 11/1973 | Quast et al | 210/525 |

Primary Examiner—Theodore A. Granger

[57] ABSTRACT

A circular-tank gravity thickener having a central rotating feedwell is provided with a skimmer which is entirely supported by and rotates with the feedwell so that the rotating scraper mechanism may be elevated independently in a conventional manner.

2 Claims, 2 Drawing Figures

THICKENER WITH ELEVATABLE SCRAPER AND NON-ELEVATING SKIMMER

BACKGROUND OF THE INVENTION

The prior art includes thickeners of the type shown in this application wherein the scraper mechanism is elevatable but no provision is made for skimming. The prior art also includes thickeners such as shown in this application having a skimming mechanism which is supported jointly by the rotating feedwell and by the scraper mechanism, but the scraper mechanism cannot be elevatable.

The usual drive mechanism for the thickener of the type wherein the scraper mechanism is elevatable includes a large driven gear which directly rotates an outer drive tube. The lower end of the inner driven tube carries the scraper mechanism. The upper end of the inner tube projects upward and is journally connected to a lift mechanism by which the driven tube and the scraper mechanism may be raised to elevate the scrapers from immediately above the floor of the tank.

As is customary, the scrapers are rotated periodically whereas the feed or the amount of settleable solids in the feed may vary such that the torque required to rotate the mechanism may overload the motor or the rotating structure because the scrapers are "buried" in the settled solids. By elevating the scrapers so that they are nearer an upper level of the settled solids, they are then able to function and are relowered as the elevation of the settled solids is lowered.

For that purpose the inner driven tube is laterally supported by and vertically movable in the outer drive tube and the two tubes include a key and keyway by which the rotation of the outer tube is imparted to the inner tube while allowing the inner tube the vertical movement referred to. U.S. Pat. Nos. 2,087,725 and 2,588,115 show such usual drive means.

SUMMARY OF THE INVENTION

The invention provides in a clarifier of the type having a central feedwell and a rotating scraper mechanism which includes an inner elevatable drive shaft carrying the scrapers and an outer drive tube which drives the shaft and supports the feedwell which rotates therewith, and a skimming mechanism which is supported directly by and from the feedwell so that raising and lowering of the scraper mechanism does not alter the elevation of the feedwell and the skimming mechanism. The feedwell provides a uniquely firm base for the support of the skimming blades.

DESCRIPTION OF THE PREFERRED EMBODIMENT SHOWN IN THE DRAWINGS

Figure 1:
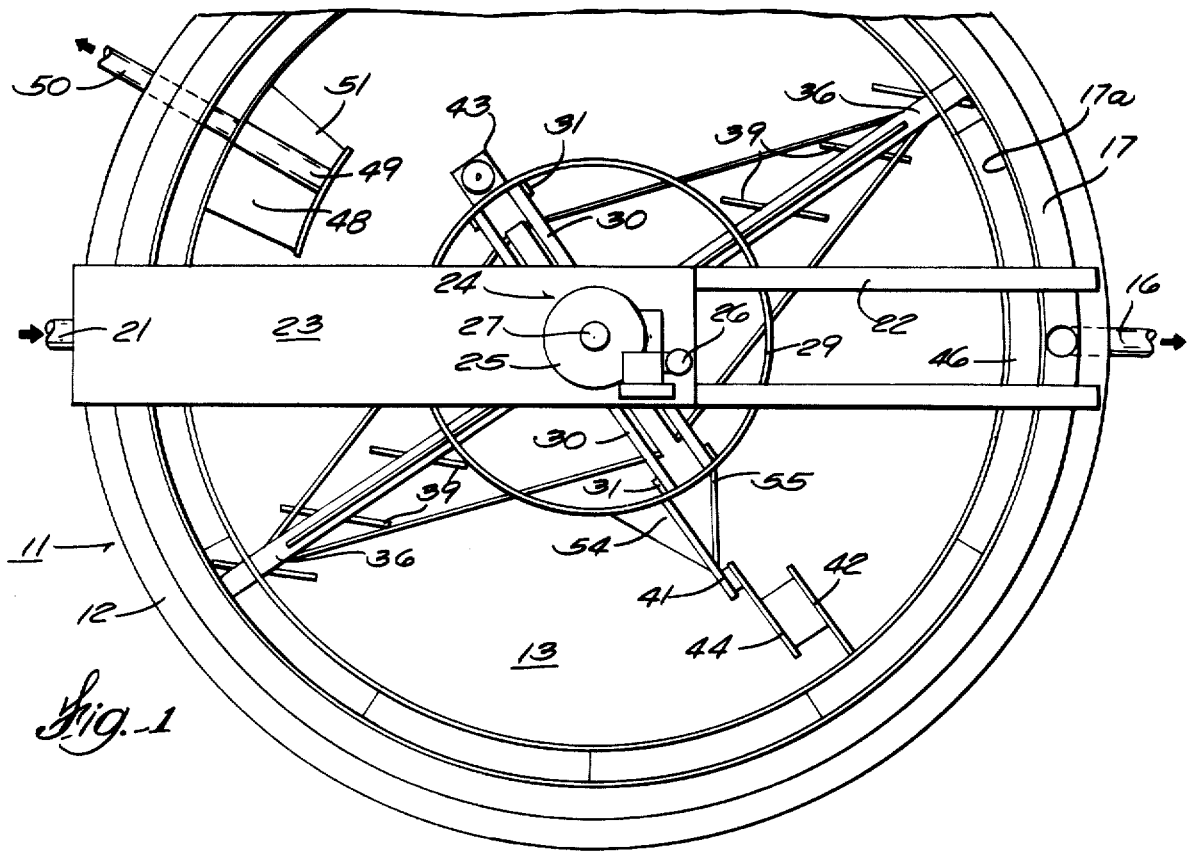
FIG. 1 is a plan view of the thickener. The tank is circular and the side portion broken away at the top of the figure is similar to that of the opposite side of the tank.

The tank 11 includes the circular concrete sidewall 12 and the bottom 13. The conical sump 14 formed in bottom 13 at the center of the tank opens into the sludge draw-off pipe 15. The effluent pipe 16 extends through sidewall 12 and is connected to the peripheral effluent trough 17 carried by sidewall 12. The inward facing side of trough 17 forms the overflow weir 17a which establishes and maintains the liquid level in the tank.

The feed to tank 11 is carried by the pipe 21 which extends to the center of the tank. Pipe 21 is supported by hangers, not shown, from the bridge comprising the two parallel steel I-beams 22 extending over and across the tank and having their ends resting on side wall 12. The deck 23 of the bridge provides access to the drive and lift mechanism 24 which is supported by beams 22.

The drive and lift mechanism 24 may be of any suitable design and includes an electric motor and reduction gear of several stages. The outer housing 25 of the reduction gear supports the drive motor 26 and the lift mechanism which includes the upper hand wheel 27. The outer drive tube 28 extends downwardly from housing 25 through the deck 23 and between beams 22 directly over sump 14. The central feedwell 29 comprises an open cylinder and the supporting cross-members 30 which are secured to the lower end of drive tube 28. Feedwell 29 is of bent three-sixteenth inch steel plate construction and may further includes vertical reinforcement flanges, including the internal flanges 31. Both the target baffle 32 below the outlet end of feed pipe 21 and feedwell 29 rotate with drive tube 28.

The radially inner ends of arms 36 are connected to the lower end of the inner driven tube 37 extending downwardly from drive tube 28 and are supported by the several rods 38 extending from driven tube 37 to the arms. The scrapers 39 attached to arms 36 are angularly disposed and arranged to push the solids which have settled on tank bottom 13 into the sump 14. A blade 41 is attached to the lower end of driven tube 37 to rotate in sump 14 and prevent agglomeration of the settled solids therein.

Figure 2:
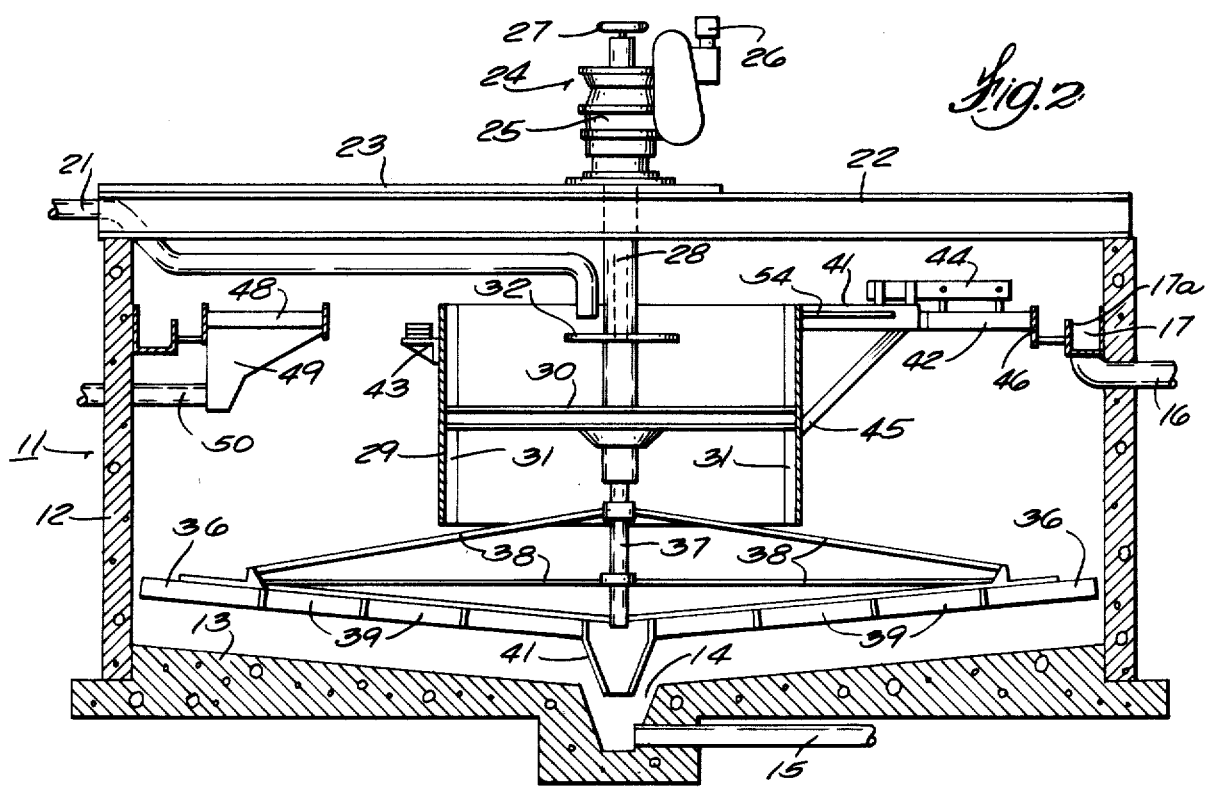
FIG. 2 is a central vertical cross-section of the tank shown in FIG. 1. Certain parts, namely the feedwell, the rotating scraper mechanism and the fixed beach and scum trough are located to place them in the plane of the section. The scraper arms are shown in the elevated position so that the scrapers are some distance from the floor of the tank.

Scrapers 39 are normally disposed in the order of one or a few inches above floor 13 as the arms are rotated by the rotation of driven tube 37. In the event that the accumulation of settled solids may overload the drive mechanism, the scrapers are elevated above bottom 13 for a period of time as the scrapers push the solids toward the center of the tank. FIG. 2 shows the scrapers in such elevated position.

For that purpose, power means may be provided for operating the lift mechanism to raise driven tube 37 or the tube may be raised by rotation of handwheel 27. While the driven tube is being raised, and also relowered, the rotation of drive tube 28 continues to rotate the inner driven tube by suitable mechanical means. Such means being part of the prior art are not further disclosed here.

The skimming mechanism is located at the liquid level within the tank and includes the radially inner blade 41 which cooperates with the radially outer blade 42 to sweep the surface of the liquid in the tank. The radially inner end of blade 41 is secured to feedwell 29 and is supported directly thereby and by the intermediate brace 43.

The projecting arm 44 extends from the outer end of blade 41 a distance above the tank liquid level and carries the blade 42 a short distance rearwardly of blade 41 having reference here to the rotation of the entire mechanism within tank 11.

The radially outer end of blade 41 is provided with a flexible portion or wiper, not shown, which remains in contact with the circular scum baffle 46. This baffle extends entirely around the center of the tank a uniform distance from the axis of rotation of the drive mechanism and is supported by spaced brackets extending from effluent trough 17. Blade 42 is of a width or radial length to push the sludge up the beach 48 and into the scum trough 49 as the blades 41 and 42 are moved around the tank by the rotation of the drive mechanism. The scum in trough 49 is discharged through pipe 50 extending through wall 12 and the blade 42 moves downwardly on ramp 51 after passing over the scum trough. Beach 48, trough 49 and ramp 51 of of conventional construction and can be variously supported in place alongside scum baffle 46.

The skimming blades 41 and 42 are readily secured to feedwell 29 which provides a large, rigid structure from which braces may be angularly extended to support inner blade 41 which in turn supports the outer blade 42. Additionally, the shelf 43 is readily secured to feedwell 29 at the side opposite blade 41 for carrying a selected number of counterweights. As shown, the lower end of brace 45 is attached to feedwell 29 some distance below the securement of blade 41 to the feedwell and extends angularly upwardly to the radially outer end of blade 41. The upper outer end of brace 45 is secured to blade 41 in any suitable manner whereby the weight of blades 41 and 42 is fully supported.

Lateral braces 54 and 55 are shown in the drawings. Brace 54 extends angularly from feedwell 29 to the end of blade 41 and is located forwardly of the blade 41. It is in slight tension and thus the brace may comprise for example a one-half inch steel rod. Brace 55 which is located behind blade 41 is in comparison and must be somewhat more sturdy so that it does not collapse. This possibility is not to be expected, but it can occur and it should be appreciated that a thickener of the type shown must be designed for total dependability. Generally, either brace 54 or 55 should be sufficient, of course because of the size and inherent rigidity of the feedwell to which the braces including particularly brace 45 may be secured. The rotation and fixed elevation of the skimming mechanism is thus efficiently provided by the feedwell.

The invention is described with reference to a thickener but may be utilized in a clarifier as well where the concentration of the sludge solids is a secondary function.

I claim:

1. In a tank for the gravity separation of suspended solids from a liquid which tank includes side walls, a bottom, an influent pipe extending to the center of the tank, a bridge extending over the center of the tank and supporting said pipe, a central sump for receiving the solids settled on the tank bottom, a peripheral effluent trough having an overflow weir which establishes and maintains the liquid level within the tank, a central vertical drive shaft within the tank, scraper arms attached to and carried by the lower portion of said shaft and having scrapers for pushing the settled solids for movement over the tank bottom and pushing the settled solids to said sump, a drive and lift mechanism carried by said bridge and connected to the upper end of said shaft for adjusting the elevation of the scrapers of said scraper arms relative to the tank bottom, a drive tube surrounding the upper portion of said drive shaft, an influent well carried by and rotating with said drive tube, said influent pipe being carried by the bridge and opening into said feedwell, said feedwell defining an upper central influent distribution zone within the tank, and a skimming blade connected to, supported by and rotatable by and with said feedwell.

2. The tank of claim 1 which further includes braces connecting the skimming blade and the feedwell for the lateral and vertical support of the blade by the feedwell.

* * * * *